United States Patent
Shao

(10) Patent No.: US 12,489,827 B2
(45) Date of Patent: Dec. 2, 2025

(54) METHODS AND SYSTEMS FOR INFORMATION PUSH IN INDUSTRIAL INTERNET OF THINGS (IIoT) BASED ON SERVICE CLOUD PLATFORMS

(71) Applicant: CHENGDU QINCHUAN IOT TECHNOLOGY CO., LTD., Sichuan (CN)

(72) Inventor: Hanshu Shao, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/973,232

(22) Filed: Dec. 9, 2024

(65) Prior Publication Data

US 2025/0106301 A1    Mar. 27, 2025

(30) Foreign Application Priority Data

Oct. 30, 2024    (CN) .......................... 202411523910.8

(51) Int. Cl.
*G06F 15/16*    (2006.01)
*G06Q 10/0631*   (2023.01)
(Continued)

(52) U.S. Cl.
CPC ....... *H04L 67/55* (2022.05); *G06Q 10/06315* (2013.01); *H04L 67/12* (2013.01)

(58) Field of Classification Search
CPC .... H04L 67/55; H04L 67/12; G06Q 10/06315
See application file for complete search history.

(56) References Cited

U.S. PATENT DOCUMENTS

2020/0160207 A1* 5/2020 Song ................... G06F 11/3466
2020/0348662 A1* 11/2020 Cella ................ G05B 19/41865

FOREIGN PATENT DOCUMENTS

CN    102970278 A    3/2013
CN    110390605 A    10/2019
(Continued)

OTHER PUBLICATIONS

Fang, Hui et al., Manufacturing information active recommendation based on Web service, Computer Integrated Manufacturing Systems, 14(11): 2253-2260, 2008.
(Continued)

*Primary Examiner* — Normin Abedin
(74) *Attorney, Agent, or Firm* — PORUS IP LLC

(57) ABSTRACT

Provided are a method, a system, and a storage medium for information push in IIoT based on a service cloud platform. The method includes: obtaining first sensor information of a first production line; determining, based on the first sensor information, a candidate push object and a push demand value of the candidate push object; determining a target push object based on the push demand value; determining reference information of the target push object based on the first sensor information, and sending the reference information to an IIoT user platform corresponding to the target push object; in response to receiving a recommended demand, generating at least one of a recommended production parameter and a recommended monitoring parameter based on the reference information, and sending the parameter(s) to the IIoT user platform corresponding to the target push object to obtain confirmation information; and generating, based on the confirmation information, an adjustment instruction.

6 Claims, 4 Drawing Sheets

(51) Int. Cl.
*H04L 67/12* (2022.01)
*H04L 67/55* (2022.01)

(56) References Cited

FOREIGN PATENT DOCUMENTS

| | | |
|---|---|---|
| CN | 113468430 A | 10/2021 |
| CN | 114488988 B | 7/2022 |
| CN | 114693129 A | 7/2022 |
| CN | 118732629 A | 10/2024 |
| CN | 118740634 A | 10/2024 |
| EP | 2660667 A2 | 11/2013 |

OTHER PUBLICATIONS

Cui, Jindong et al., Production Information Management Mechanism of Manufacturing Enterprises Based on "Internet +" and Cloud Service, Information Science, 36(12): 77-82, 2018.

* cited by examiner

METHODS AND SYSTEMS FOR INFORMATION PUSH IN INDUSTRIAL INTERNET OF THINGS (IIoT) BASED ON SERVICE CLOUD PLATFORMS

CROSS-REFERENCE TO RELATED APPLICATIONS

This application claims priority to Chinese Patent Application No. 202411523910.8, filed on Oct. 30, 2024, the entire content of which is hereby incorporated by reference.

TECHNICAL FIELD

The present disclosure relates to the field of information interaction of Internet of Things (IoT), and in particular relates to a method and a system for information push in Industrial Internet of Things (IIoT) based on a service cloud platform.

BACKGROUND

Currently, IoT-based smart manufacturing technologies are rapidly developing, becoming the core and foundation of manufacturing transformation. However, when there are multiple sets of production lines (or multiple processing plants or factories), the IIoT systems corresponding to the multiple sets of production lines operate independently, leading to an inability for information exchange between different production lines, low data utilization, and an underutilization of the potential value of the data.

Therefore, it is necessary to provide a method and a system for information push in IIoT based on a service cloud platform to achieve information intercommunication and effective data utilization among various IIoT systems, as well as to provide reasonable references for the operation and information processing of each IIoT system.

SUMMARY

One or more embodiments of the present disclosure provide a method for information push in Industrial Internet of Things (IIoT) based on a service cloud platform. The method is executed by the service cloud platform of a system for information push in IIoT. The method comprises: obtaining first sensor information of a first production line via an IIoT service platform corresponding to the first production line; determining a candidate push object based on the first sensor information, the candidate push object including an administrative user of at least one second production line; determining a push demand value of the candidate push object based on the first sensor information and the candidate push object; determining a target push object based on the push demand value, the target push object including an administrative user of a target production line among the at least one second production line; determining, based on the first sensor information, reference information of the target push object, and sending the reference information to an IIoT user platform corresponding to the target push object; in response to receiving a recommended demand, generating at least one of a recommended production parameter and a recommended monitoring parameter based on the reference information, wherein the recommended demand is determined by the target push object based on the reference information, and the recommended demand is sent by the target push object through the IIoT user platform corresponding to the target push object; sending at least one of the recommended production parameter and the recommended monitoring parameter to the IIoT user platform corresponding to the target push object and obtaining confirmation information; and generating, based on the confirmation information, an adjustment instruction, and sending the adjustment instruction to an IIoT service platform corresponding to the target production line, so as to adjust a production parameter of a production device and a monitoring parameter of a monitoring device on the target production line.

One or more embodiments of the present disclosure provide a system for information push in Industrial Internet of Things (IIoT). The system comprises a service cloud platform and a plurality of sub-systems corresponding to a plurality of production lines, wherein each of the plurality of sub-systems includes an IIoT user platform, an IIoT service platform, an IIoT management platform, an IIoT sensor network platform, and an IIoT perceptual control platform. The plurality of production lines include a first production line and at least one second production line. The service cloud platform is configured to: obtain first sensor information of the first production line via an IIoT service platform corresponding to the first production line; determine a candidate push object based on the first sensor information, the candidate push object including an administrative user of the at least one second production line; determine a push demand value of the candidate push object based on the first sensor information and the candidate push object; determine a target push object based on the push demand value, the target push object including an administrative user of a target production line among the at least one second production line; determine, based on the first sensor information, reference information of the target push object, and send the reference information to an IIoT user platform corresponding to the target push object; in response to receiving a recommended demand, generate at least one of a recommended production parameter and a recommended monitoring parameter based on the reference information, wherein the recommended demand is determined by the target push object based on the reference information, and the recommended demand is sent by the target push object through the IIoT user platform corresponding to the target push object; send at least one of the recommended production parameter and the recommended monitoring parameter to the IIoT user platform corresponding to the target push object and obtain confirmation information; and generate, based on the confirmation information, an adjustment instruction, and send the adjustment instruction to an IIoT service platform corresponding to the target production line, so as to adjust a production parameter of a production device and a monitoring parameter of a monitoring device on the target production line.

One or more embodiments of the present disclosure provide a non-transitory computer-readable storage medium storing computer instructions, wherein when a computer reads the computer instructions in the storage medium, the computer performs the method for information push in IIoT described in the present disclosure.

BRIEF DESCRIPTION OF THE DRAWINGS

The present disclosure will be further illustrated by way of exemplary embodiments, which will be described in detail through the accompanying drawings. These embodiments are not limiting, and in these embodiments, the same numbering denotes the same structure, wherein.

DETAILED DESCRIPTION

Figure 1:
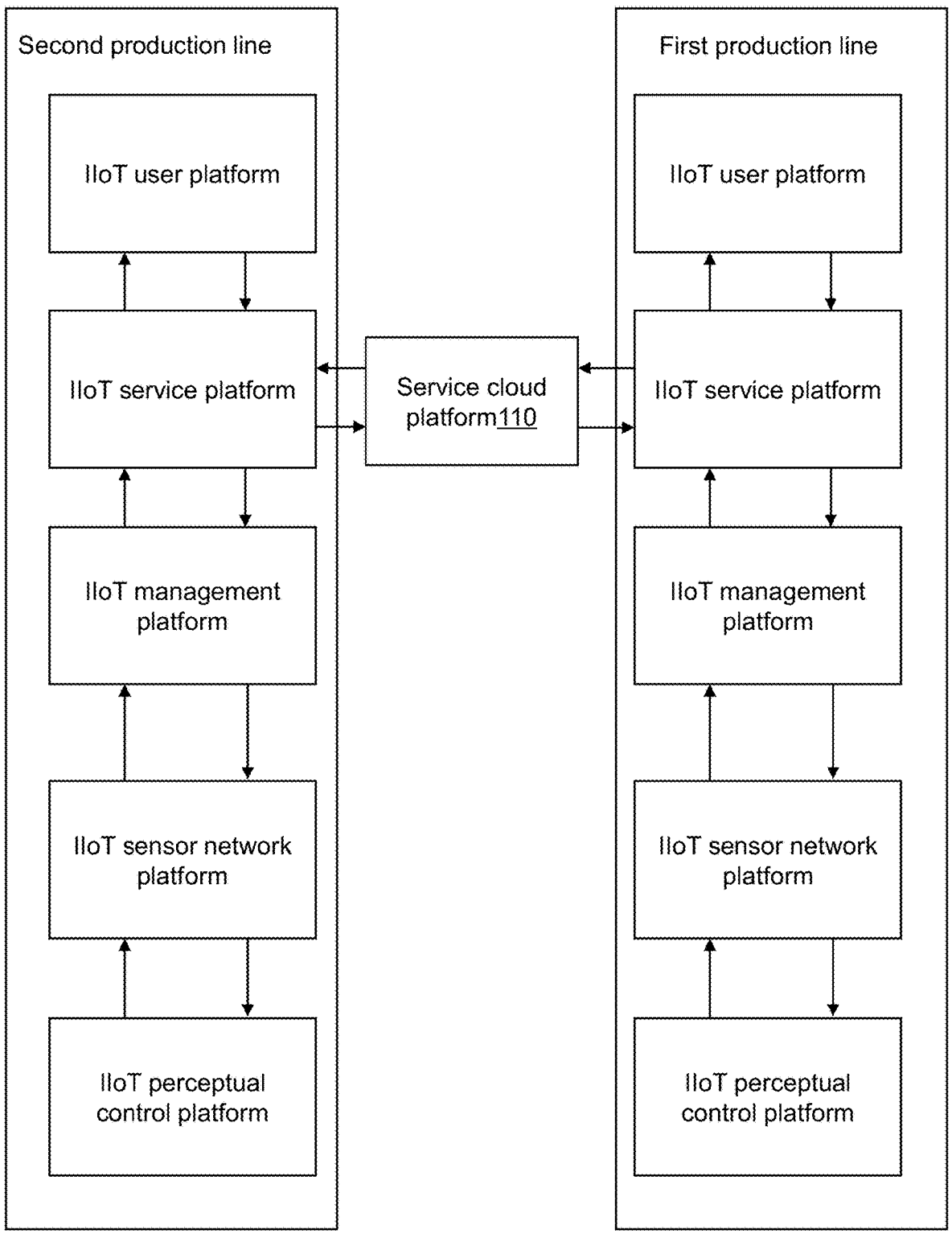
FIG. 1 is an exemplary block diagram of a system for information push in IIoT according to some embodiments of the present disclosure.

In order to provide a clearer understanding of the technical solutions of the embodiments described in the present disclosure, a brief introduction to the drawings required in the description of the embodiments is given below. It is evident that the drawings described below are merely some examples or embodiments of the present disclosure, and for those skilled in the art, the present disclosure may be applied to other similar situations without exercising creative labor. Unless otherwise indicated or stated in the context, the same reference numerals in the drawings represent the same structures or operations.

It should be understood that the terms "system," "device," "unit," and/or "module" used herein are ways for distinguishing different levels of components, elements, parts, or assemblies. However, if other terms can achieve the same purpose, they may be used as alternatives.

As indicated in the present disclosure and in the claims, the singular forms "a," "an," and "the" may be intended to include the plural forms as well, unless the context clearly indicates otherwise. In general, the terms "comprise," "comprises," and/or "comprising," "include," "includes," and/or "including," when used in this disclosure, specify the presence of stated features, integers, steps, operations, elements, and/or components, but do not preclude the presence or addition of one or more other features, integers, steps, operations, elements, components, and/or groups thereof.

Flowcharts are used in the present disclosure to illustrate the operations performed by the system according to the embodiments described herein. It should be understood that the operations may not necessarily be performed in the exact sequence depicted. Instead, the operations may be performed in reverse order or concurrently. Additionally, other operations may be added to these processes, or one or more operations may be removed.

FIG. 1 is an exemplary block diagram of a system for information push in IIoT according to some embodiments of the present disclosure.

As shown in FIG. 1, a system 100 for information push in IIoT 100 (hereinafter referred to as the information push system 100) may include a service cloud platform 110 and a plurality of sub-systems because there may be a plurality of production lines (or a plurality of processing plants or factories) at the time of production. One production line corresponds to one sub-system. Each sub-system includes an IIoT user platform, an IIoT service platform, an IIoT management platform, an IIoT sensor network platform, and an IIoT perceptual control platform. The plurality of production lines includes a first production line and at least one second production line. Each of the plurality of sub-systems is communicatively connected to a service cloud platform 110, and the sharing of information in the sub-systems is realized through the service cloud platform.

The service cloud platform is a platform that is designed to enable the interaction of information between multiple sub-systems. In some embodiments, the service cloud platform is configured as a cloud server that interacts with the IIoT service platforms in different sub-systems.

In some embodiments, the service cloud platform is configured to determine, based on the first sensor information, a candidate push object and a push demand value for the candidate push object; determine, based on the first sensor information and the push demand value, a target push object and reference information of the target push object; generate, in response to the target push object issuing a recommended demand, at least one of a recommended production parameter and a recommended monitoring parameter based on the reference information; and generate an adjustment instruction based on the confirmation information.

In some embodiments, the service cloud platform is further configured to determine, based on the first sensor information and second sensor information, an information reference degree; determine, based on the information reference degree, the push demand value; determine, based on a correlation value and a valid information density of the first sensor information, the information reference degree; determine the information reference degree based on an increment of reference information; and correcting the information reference degree based on a feedback operation.

In some embodiments, the service cloud platform is further configured to determine reference information based on a reference demand and the first sensor information; determine the reference demand by a demand model based on target sensor information and the first sensor information; train the demand model based on a preference training set to obtain a target demand model of a target push object; and designated correlated sensor information with a reference identifier as the reference information.

The IIoT user platform is a platform for interacting with an administrative user. In some embodiments, the IIoT user platform is configured as a terminal device and/or a terminal interface. The terminal device may include a mobile device, a tablet computer, a laptop computer, or the like. The terminal interface may include a terminal device interface, a web page, etc.

The IIoT service platform is a platform that provides information and services for the administrative user. In some embodiments, the IIoT service platform is configured on a local server. The IIoT service platform may interact with the IIoT user platform and the IIoT management platform.

The IIoT management platform is a platform that manages information and/or data related to the sub-system. In some embodiments, the IIoT management platform includes a processor, a storage device, etc. The storage device may store a database. The database is a database management system that supports highly concurrent access. The processor may include one or more processing engines (e.g., a single-chip processing engine or a multi-chip processing engine). By way of example only, the processor may include a central processing unit (CPU), an application-specific integrated circuit (ASIC), an application-specific instruction processor (ASIP), a graphics processor (GPU), etc., or any combination of the above.

The IIoT sensor network platform is a platform for integrated management of sensing information. In some embodiments, the IIoT sensor network platform is configured as a communication network or a gateway and a network interface, or the like. The IIoT sensor network platform may interact with the IIoT management platform and the IIoT perceptual control platform.

The IIoT perceptual control platform is a functional platform for perception information generation and control information execution. In some embodiments, the IIoT perceptual control platform includes a production device and a monitoring device.

The production device may include equipment used for production of a product such as storage equipment, transfer equipment, processing equipment, or the like. The monitoring device refers to equipment used to monitor a production status and a production environment of a production line, for example, a temperature sensor, a humidity sensor, a quality detector, or the like. The quality detector may include a quality detector for testing product quality and a quality detector for testing the quality of an intermediate part. In some embodiments, each process on the production line may be provided with a set of production devices and monitoring devices.

A detailed description of the foregoing may be found in the descriptions of FIG. 2 to FIG. 5.

In some embodiments of the present disclosure, based on the information push system 100, a closed loop of information operation can be formed between the functional platforms, enabling the platforms to operate in a coordinated and regulated manner, and realizing intelligent information push in the IIoT.

Figure 2:
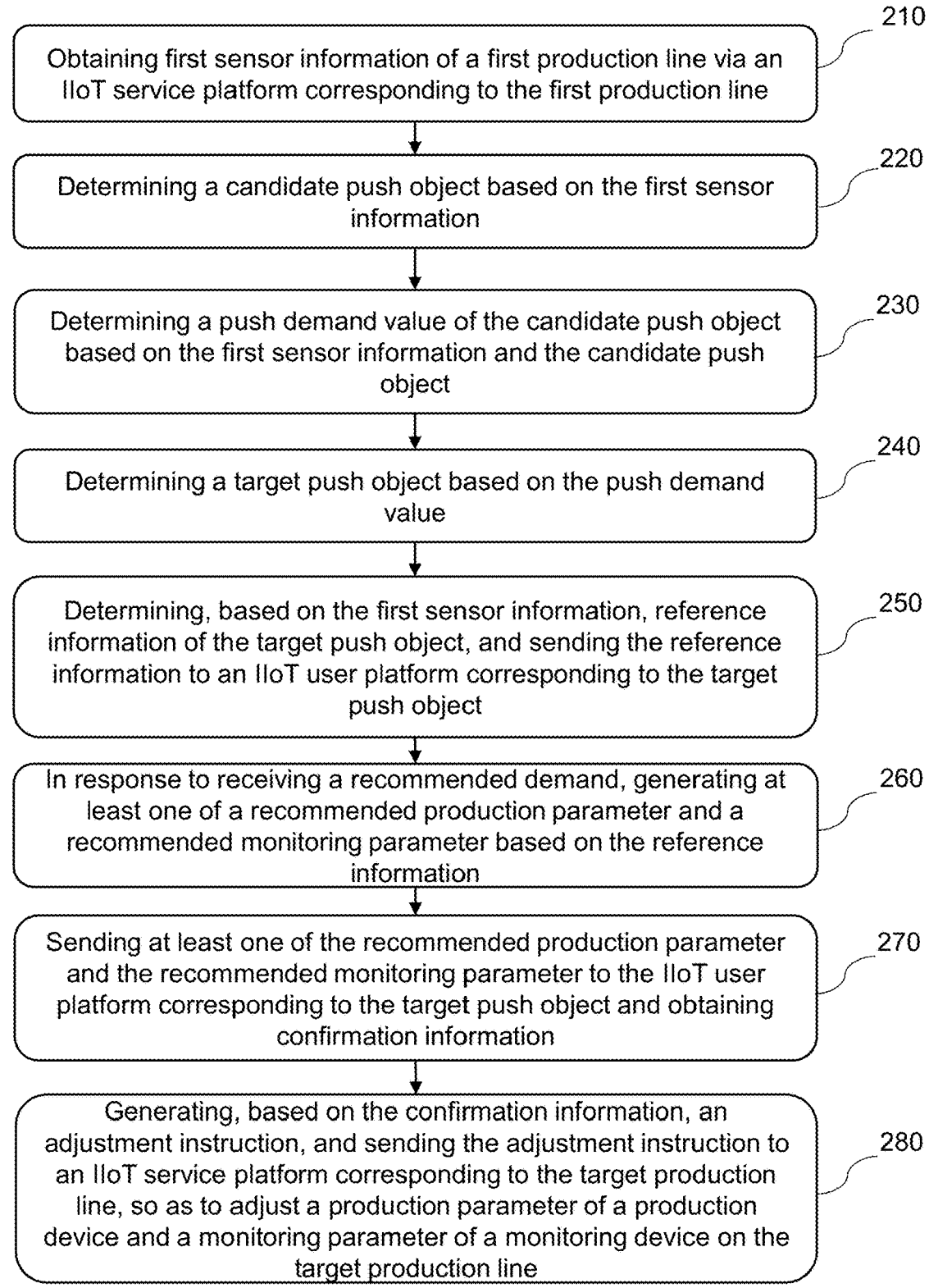
FIG. 2 is a flowchart of an exemplary process of a method for information push in IIoT based on a service cloud platform according to some embodiments of the present disclosure.

FIG. 2 is a flowchart of an exemplary process of a method for information push in IIoT based on a service cloud platform according to some embodiments of the present disclosure. In some embodiments, process 200 is performed by a service cloud platform of the information push system 100. As shown in FIG. 2, process 200 includes the following operations.

In some embodiments, the service cloud platform obtains first sensor information through an IIoT service platform corresponding to a first production line; determines candidate push object and a push demand value for the candidate push object based on the first sensor information; and determine a target push object based on the push demand value. The service cloud platform determines reference information of the target push object based on first sensor information, and sends the reference information to an IIoT user platform corresponding to the target push object. In response to receiving a recommended demand, the service cloud platform generates, based on the reference information, at least one of a recommended production parameter and a recommended monitoring parameter, which is sent to the IIoT user platform corresponding to the target push object. The service cloud platform obtains confirmation information and generates an adjustment instruction based on the confirmation information.

More descriptions of the various platforms of the information push system 100 may be found in the corresponding descriptions of FIG. 1.

In 210, obtaining first sensor information of a first production line via an IIoT service platform corresponding to the first production line.

The first production line is a production line that needs to share information to other production lines.

The first sensor information is sensing information associated with the first production line. In some embodiments, the sensing information includes production data, monitoring data, etc., of the production line. The sensing information includes a plurality of sets of data, each set of the plurality of sets of data corresponding to a process in the production line.

In some embodiments, the sensing information corresponding to each process is obtained through a production device and a monitoring device corresponding to the process. The sensing information may include an identifier of a device from which the sensing information is originated. Descriptions of the production device and the monitoring device may be found in FIG. 1 and its associated description.

The production data is data related to the production line performing production. In some embodiments, the production data includes a production parameter, operational data, etc. of the production device. For example, the production parameter includes a real-time material remaining volume in a storage device, a transfer speed of a transfer device, a tool feed of a cutting machine, or the like. The operational data includes working hours of the production device, etc.

The monitoring data is data obtained from monitoring the production line. In some embodiments, the monitoring data comprises a monitoring result of the monitoring device. For example, the monitoring data includes a processing temperature monitored by a temperature sensor, a humidity of the processing environment monitored by a humidity sensor, and quality data of an intermediate part or a product monitored by a quality tester, etc. The quality data is represented by a pass rate, a superior product rate, or an inferior product rate. How the intermediate part or the product is determined to be qualified or superior or inferior is not limited by the present disclosure.

In some embodiments, the service cloud platform obtains the first sensor information through an IIoT service platform corresponding to the first production line. The IIoT service platform obtains the first sensor information through an IIoT management platform, an IIoT sensor network platform, and an IIoT perceptual control platform.

In 220, determining a candidate push object based on the first sensor information.

The candidate push object is an object to be determined for pushing information. In some embodiments, the candidate push object includes an administrative user of at least one second production line.

The second production line is a production line other than the first production line. It may be understood that the information push system 100 may realize data interaction between different production lines, so the relationship between the first production line and the second production line is relative. When the service cloud platform wants to share the sensing information of one production line with other production lines, the production line is the first production line, and all other production lines are the second production line.

The administrative user is a relevant person who manages the production line. The administrative user may include a person in charge of the production line, a person in charge of each process on the production line, etc.

In some embodiments, the service cloud platform determines the candidate push object in multiple ways based on the first sensor information. For example, the service cloud platform constructs a plurality of first production vectors based on the production parameter of each production device in the first sensor information and constructs a plurality of second production vectors based on the production parameter of each production device in the second sensor information of each second production line. For each of the plurality of first production vectors, the service cloud platform matches, based on the first production vector, a second production vector among the plurality of second production vectors that satisfies a preset match condition, and determines a process in which the production device corresponding to the secondary production vector that satisfies the preset match conditions is located. The service cloud platform determines the person in charge of the process and the person in charge of the second production line in which the process is located as the candidate push object. The first production vector refers to a feature vector constructed based on the production parameter of the production device in the first sensor information. The second production vector is a feature vector constructed based on the production parameter of the production device in the second sensor information. More descriptions of the second sensor information may be found in the related description below.

The preset match condition may include a similarity greater than a similarity threshold. The similarity threshold may be preset based on historical experience. The similarity between vectors is negatively correlated to a distance of the vectors. Vector distances include Euclidean distances, or the like.

In 230, determining a push demand value for the candidate push object based on the first sensor information and the candidate push object.

The push demand value is a value that characterizes the extent to which the candidate push object needs the first sensor information. The push demand value may be expressed, for example, by a numerical value. The larger the numerical value, the larger the push demand value, indicating that the candidate push object has a higher degree of need for the first sensor information.

In some embodiments, the service cloud platform determines the push demand value based on the first sensor information and the candidate push object in multiple ways. For example, the service cloud platform determines a reference attribute of the first sensor information based on the monitoring data in the first sensor information, and determines a recommended demand value of the candidate push object based on the reference attribute of the first sensor information and the similarity between the second production vector and the first production vector. The second production vector herein is a second production vector that satisfies the preset match condition.

Reference attributes are the types of references that may be provided by the sensing information. Reference attributes may include "recommended reference," "recommended prevention," or "none".

The reference attribute "recommended reference" means that the quality of the intermediate part or the product produced by the process is better and may be used as a reference for the corresponding intermediate part or product in the second production line, so that the quality of the products in other production lines may be improved.

The reference attribute "recommended prevention" means that the quality of the intermediate part or the product produced by the process is poor, and the second production line needs to be reminded to prevent a similar situation.

The reference attribute of "none" indicates that the intermediate part or the product produced by the process is of medium quality and has no reference value.

In some embodiments of the present disclosure, the service cloud platform determines a reference attribute of the first sensor information based on the quality data in the first sensor information corresponding to the process and a reference quality range. For example, in response to the quality data of the process being greater than an upper limit of the reference quality range, the service cloud platform determines the reference attribute of the first sensor information corresponding to the process as "recommended reference"; in response to the quality data of the process being less than a lower limit of the reference quality range, the service cloud platform determines the reference attribute of the first sensor information corresponding to the process as "recommended prevention"; in response to the quality data of the process being within the reference quality range, the service cloud platform determines the reference attribute of the first sensor information corresponding to the process as "none". The reference quality range refers to a range of quality data that meets production requirements.

The reference quality range is expressed according to the representation of the quality data; if the quality data is expressed through the pass rate, the reference quality range is a range of pass rates that meet production requirements. If the quality data is expressed through the superior rate or the inferior rate, the reference quality range may be adjusted accordingly.

In some embodiments of the present disclosure, the service cloud platform determines, based on historical quality data in historical data, a mean and a variance of the historical quality data, takes a sum of the mean and the variance as the upper limit of the reference quality range, and takes a difference between the mean and the variance as the lower limit of the reference quality range.

In some embodiments of the present disclosure, in response to determining that the reference attribute of the first sensor information is "recommended reference" or "recommended prevention", the higher the similarity between the second production vector and the first production vector, the higher the recommended demand value determined by the service cloud platform. If the reference attribute of the first sensor information is "none", the service cloud platform sets the recommended demand value to 0.

Figure 3:
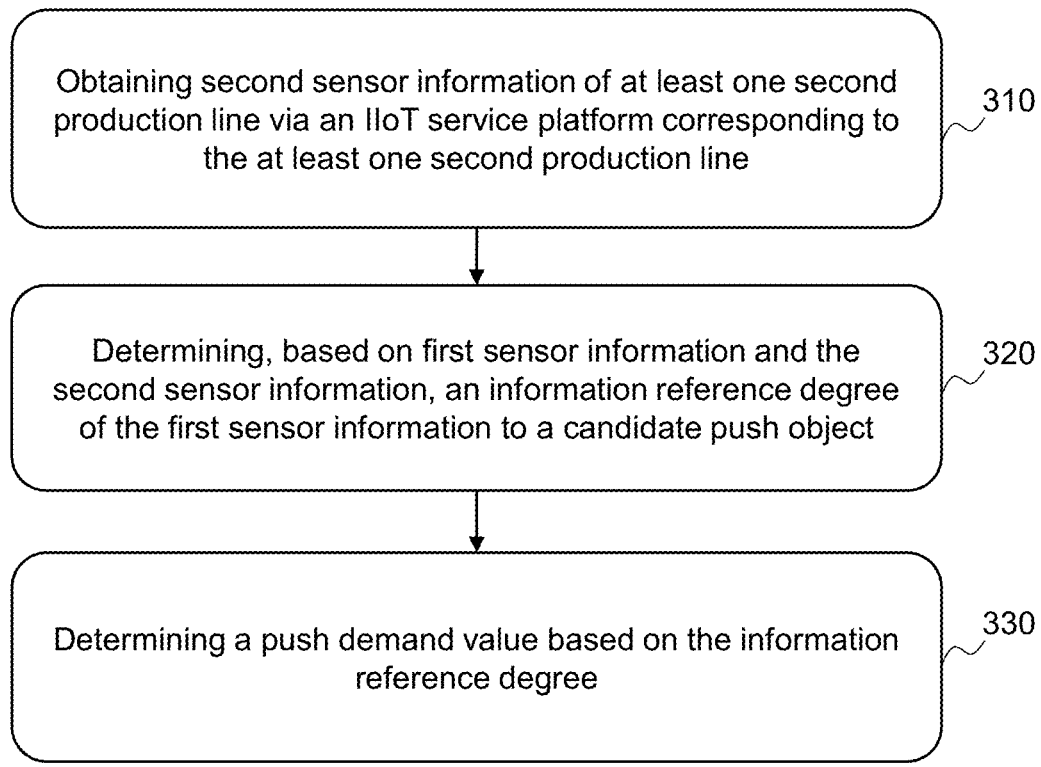
FIG. 3 is a flowchart of an exemplary process for determining a push demand value according to some embodiments of the present disclosure.

In some embodiments of the present disclosure, the service cloud platform determines the push demand value based on an information reference degree, more descriptions of which may be seen in FIG. 3 and its related descriptions.

In 240, determining a target push object based on the push demand value. The target push object is a determined object for information push. The target push object includes an administrative user of a target production line in at least one second production line.

The target production line is a second production line that is identified to receive information from the first production line.

In some embodiments of the present disclosure, the service cloud platform determines the target push object based on the push demand value. For example, the service cloud platform takes a candidate push object with a recommended demand value greater than a recommended demand threshold as the target push object. For example, if the administrative user does not set the recommended demand threshold, the service cloud platform identifies all candidate push objects with the recommended demand value greater than 0 as target push objects. The recommended demand threshold may be pre-set by the administrative user based on historical experience.

In 250, determining, based on the first sensor information, reference information of the target push object, and sending the reference information to the IIoT user platform corresponding to the target push object.

The reference information is information that is informative about the target push object in the first sensor information.

In some embodiments of the present disclosure, the service cloud platform determines the reference information of the target push object based on the first sensor information in multiple ways. For example, the service cloud platform selects a first production vector that may be matched to a second production vector that satisfies the preset match condition in operation 220, and determines the first sensor information corresponding to the first production vector as the reference information.

In some embodiments of the present disclosure, the service cloud platform obtains a reference demand of the target push object; and determines the reference information based on the reference demand and the first sensor information.

The reference demand is a type of information that the target push object needs. For example, if the administrative user needs the reference information that prevents disqualified products, the reference demand may be "preventing disqualified products"; if the administrative user needs the reference information that improves production quality, the reference demand may be "improving quality".

In some embodiments of the present disclosure, the reference demand may be determined by the administrative user based on problems encountered in production and uploaded to the service cloud platform.

Figure 4:
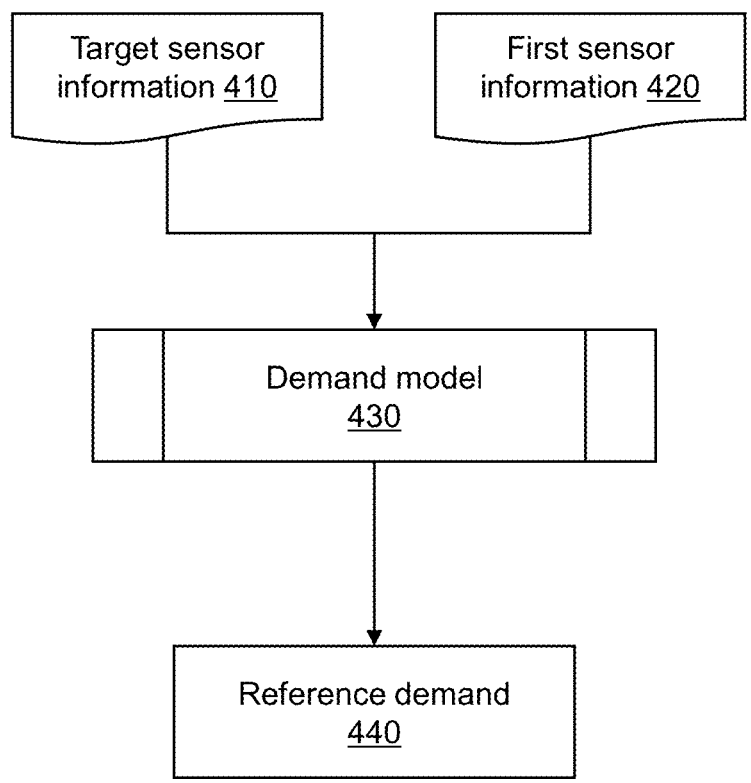
FIG. 4 is a schematic diagram of an exemplary demand model according to some embodiments of the present disclosure.

In some embodiments of the present disclosure, the service cloud platform determines the reference demand through a demand model based on target sensor information corresponding to the target push object during a preset period and first sensor information, more descriptions of which may be seen in FIG. 4 and its related descriptions.

In some embodiments of the present disclosure, the service cloud platform determines, based on the reference demand, first sensor information that fulfill the reference demand as the reference information. For example, if the reference demand is "preventing disqualified products," the service cloud platform determines first sensor information corresponding to a process with relatively low quality data as the reference information, and designates the reference demand as an identifier of the reference information.

In some embodiments of the present disclosure, the service cloud platform determines, based on the reference demand, correlated sensor information in the first sensor information; sets a reference identifier for the correlated sensor information based on the reference demand; and designates the correlated sensor information with the reference identifier as the reference information.

The correlated sensor information is sensing information that is related to the reference demand of the target push object. In some embodiments of the present disclosure, the service cloud platform may analyze, based on the first sensor information corresponding to the target process, a production quality, a production efficiency, an equipment loss, or the like of the target process to determine whether the first sensor information satisfies the reference demand. In response to determining that the first sensor information is able to meet the reference demand, the first sensor information is determined as the correlated sensor information. The target process is a process in the first production line that satisfies a preset screening condition. The preset screening condition includes that there is an influencing process chain of processes of a same type in the target production line. More descriptions of the influencing process chain may be found in FIG. 3 and its related description.

Exemplarily, the reference demand may include "improving quality", and if the quality data corresponding to the target process is greater than the upper limit of the reference quality range, the service cloud platform determines that the first sensor information corresponding to the target process satisfies the reference demand of "improving quality".

The reference identifier is an identifier associated with the correlated sensor information. In some embodiments of the present disclosure, the reference identifier includes an identifier of the target process corresponding to the correlated sensor information, an identifier of the influencing process chain of the target process, and an identifier of the reference demand that the correlated sensor information satisfies.

In some embodiments of the present disclosure, the service cloud platform designates the correlated sensor information with the reference identifier as the reference information.

In some embodiments of the present disclosure, by identifying the correlated sensor information that has a higher degree of correlation with the reference demand and setting the reference identifier for the correlated sensor information, the type of references that the correlated sensor information may provide to the user can be quickly determined, thereby providing the user with the most needed reference information.

In some embodiments of the present disclosure, segmenting the first sensor information based on the reference demand allows for determining the reference information that more closely matches the user's needs.

In 260, generating, in response to receiving a recommended demand, at least one of a recommended production parameter and a recommended monitoring parameter based on the reference information.

The recommended demand is a request for information from the target push object. In some embodiments of the present disclosure, the administrative user, after browsing the reference information to determine the information they want to obtain, sends a recommended demand by interacting with the IIoT user platform. For example, after browsing the reference information, the administrative user determines that they would like to obtain the reference information, the administrative user may click a relevant button on a page of a terminal device (such as the button of "obtaining recommended information") to send the recommended demand.

The recommended production parameter is a production parameter recommended by the service cloud platform.

The recommended monitoring parameter is a monitoring parameter recommended by the service cloud platform. The monitoring parameter includes a monitoring frequency of the monitoring device, or the like.

In some embodiments of the present disclosure, the service cloud platform generates the recommended production parameter and the recommended monitoring parameter based on the reference information. For example, for reference information whose reference attribute is "recommended reference", the service cloud platform may use the production parameter in the reference information as a benchmark to adjust the production parameter of the production device in the target production line toward the benchmark to obtain the recommended production parameter. A magnitude of the adjustment may be set in advance based on historical experience.

As another example, for reference information whose reference attribute is "recommended prevention," the service cloud platform may increase the monitoring parameter based on the similarity between the first production vector and the second production vector, and the higher the similarity, the higher the monitoring parameter is increased.

In 270, sending at least one of the recommended production parameter and the recommended monitoring parameter to the IIoT user platform corresponding to the target push object and obtaining confirmation information.

The confirmation information is information sent by the administrative user to confirm the recommended production parameter and the recommended monitoring parameter.

Exemplarily, the confirmation information may include the recommended production parameter and the recommended monitoring parameter, indicating that the administrative user chooses to adopt the recommended production parameter and the recommended monitoring parameters; the confirmation information may also include the recommended production parameter and the recommended monitoring parameters after the administrative user modifies them; the confirmation information may also include not adjusting a current production parameter and a current monitoring parameter.

In 280, generating, based on the confirmation information, an adjustment instruction, and sending the adjustment instruction to the IIoT service platform corresponding to the target production line for adjusting the production parameter of the production device and the monitoring parameter of the monitoring device on the target production line.

The adjustment instruction is a command that is used to instruct the IIoT perceptual control platform to adjust relevant parameters.

In some embodiments of the present disclosure, the service cloud platform generates, based on the recommended production parameter and the recommended monitoring parameter in the confirmation information, the adjustment instruction to adjust the production parameter of the production device and the monitoring parameter of the monitoring device on the target production line to be consistent with the recommended production parameter and the recommended monitoring parameter.

In some embodiments of the present disclosure, by sharing data from different production lines, information exchange between various IIoT systems is achieved, effectively improving data utilization and providing reasonable references for the operation and information processing of each IIoT system.

It should be noted that the foregoing descriptions of the process 200 are intended to be exemplary and illustrative only and do not limit the scope of application of the present disclosure. For those skilled in the art, various corrections and changes to the process hand-eye calibration may be made under the guidance of this specification. However, these corrections and changes remain within the scope of the present disclosure.

FIG. 3 is a flowchart of an exemplary process for determining a push demand value according to some embodiments of the present disclosure. In some embodiments of the present disclosure, process 300 is performed by a service cloud platform of a system for information push in IIoT. As shown in FIG. 3, process 300 includes the following operations.

In some embodiments of the present disclosure, the service cloud platform obtains second sensor information of at least one second production line via at least one IIoT service platform corresponding to the at least one second production line; determines, based on first sensor information and the second sensor information, an information reference degree of the first sensor information to a candidate push object; and determines a push demand value based on the information reference degree.

More descriptions of the first sensor information, the candidate push object, and the second production line may be found in FIG. 2 and the related descriptions thereof.

In 310, obtaining second sensor information of at least one second production line via at least one IIoT service platform corresponding to the at least one second production line.

The second sensor information refers to sensing information related to the at least one second production line. More descriptions of the sensing information may be found in FIG. 2 and its associated description.

In some embodiments of the present disclosure, the service cloud platform obtains the second sensor information through the at least one IIoT service platform corresponding to the at least one second production line. The second sensor information of each of the at least one second production line is obtained by the IIoT service platform corresponding to the second production line through an IIoT management platform, an IIoT sensor network platform, and an IIoT perceptual control platform corresponding to the second production line.

In 320, determining, based on the first sensor information and the second sensor information, an information reference degree of the first sensor information to the candidate push object.

The information reference degree may be used to characterize the extent to which the first sensor information is available for reference to the candidate push object. In some embodiments, the information reference degree is expressed by a numerical value. The larger the numerical value, the higher the information reference degree.

In some embodiments, the service cloud platform determines the information reference degree based on the first sensor information and the second sensor information in multiple ways. For example, the service cloud platform determines a first quality level and a second quality level based on the first sensor information and the second sensor information, and determines the information reference degree based on the first quality level and the second quality level.

The quality level may indicate the overall quality of products on the production line. In some embodiments, the quality level is expressed through a grade (e.g., Grade 1, Grade 2, Grade 3, . . . ), etc. The higher the grade, the higher the quality level, the better the overall quality of the products.

In some embodiments, in response to determining that the quality data of each of the processes in the first sensor information is greater than an upper limit of a reference quality range, the service cloud platform determines the first quality level to be Grade 3; in response to determining that the quality data of each of the processes in the first sensor information is less than a lower limit of the reference quality range, the service cloud platform determines the first quality level as Grade 1; in response to determining that the quality data of more than a preset count of processes in the first sensor information is within the reference quality range, the service cloud platform determines the first quality level as Grade 2. The preset count may be set in advance based on historical experience. Related descriptions of the reference quality range and quality data may be found in FIG. 2 and its related description.

The service cloud platform may determine the second quality level based on the second sensor information in the manner described above for determining the first quality level.

In some embodiments, the service cloud platform determines the information reference degree based on the first quality level and the second quality level. For example, the service cloud platform determines the information reference degree based on a difference between the first quality level and the second quality level through a predetermined correspondence. The predetermined correspondence may include that the larger the difference between the first quality level and the second quality level, the higher the information reference degree.

It may be understood that the larger the difference between the first quality level and the second quality level, the better or worse the quality of the products of the first production line is, and the higher the information reference degree of the first sensor information to the candidate push object is. In this case, the candidate push object may refer to the first sensor information to improve the quality of products or prevent situations similar to the first production line.

In some embodiments, the service cloud platform determines, based on the first sensor information and the second sensor information, a correlation value between the first production line and at least one second production line; and determines, based on the correlation value and valid information density of the first sensor information, the information reference degree.

The correlation value characterizes the degree of correlation between the first production line and the second production line.

In some embodiments, the service cloud platform determines the correlation value between the first production line and the at least one second production line based on the first sensor information and the second sensor information. Exemplarily, the process of determining the correlation value by the service cloud platform based on the first sensor information and the second sensor information may include:

S1, for each process in the first production line, the service cloud platform determines a similarity between the process and a process of a same type in the second production line. The processes of the same type is a process that has the same role in the production line.

In some embodiments, the similarity between processes of the same type is determined based on the similarity between the first production vector and the second production vector corresponding to the production device for the type of processes. For example, the similarity between processes of the same type is equivalent to a similarity between a first production vector and a second production vector corresponding to the production device in the same type of process. More descriptions of the first production vector, the second production vector, and the similarity between the first production vector and the second production vector may be found in the relevant description in FIG. 2.

S2, for processes whose similarity is greater than a similarity threshold, an influencing process chain in the second production line is queried through a predetermined correlation table. More descriptions of the similarity threshold may be found in FIG. 2 and its related description.

In some embodiments, the predetermined correlation table is pre-set based on historical experience and includes a plurality of processes and the influencing process chain in which the plurality of processes are located.

The influencing process chain is a sequence of multiple processes that affect each other in a production line. For example, if process B affects process C, process C affects process D, and process D affects process E, then B-C-D-E is an influencing process chain.

S3, a sub-correlation value of each of the processes in the first production line is determined based on the similarity and the influencing process chain.

In some embodiments, the sub-correlation value of a process is positively correlated to the similarity between processes of the same type and a length of the influencing process chain. The higher the similarity, the longer the influencing process chain, and the higher the sub-correlation value of the process. Exemplarily, the service cloud platform determines the product of the similarity and the length of the chain of influencing processes as the sub-correlation value of the process. The length of the influencing process chain may be represented by the count of processes in the influencing process chain.

S4, the correlation value between the first production line and the second production line is determined based on the sub-correlation values of a plurality of processes.

In some embodiments, the service cloud platform determines a sum of the sub-correlation values of the plurality of processes as the correlation value between the first production line and the second production line.

The valid information density refers to the proportion of information with reference value in the first sensor information. In some embodiments, the service cloud platform extracts an amount of data of the first sensor information corresponding to one or more processes having sub-correlation value(s), and designates a ratio of the aforementioned amount of data to a total amount of data of the first sensor information as the valid information density. The service cloud platform extracts the amount of data of the sensing information through a storage device of the IIoT management platform. The amount of data may be represented by an amount of space occupied by the data in the storage device.

In some embodiments of the present disclosure, the service cloud platform determines the information reference degree based on the correlation value and the valid information density of the first sensor information. The information reference degree determined herein is obtained by adjusting an original information reference degree. Exemplarily, the service cloud platform takes the product of the original information reference degree, the correlation value, and the valid information density as an adjusted information reference degree.

In some embodiments of the present disclosure, the valid information density is positively correlated to a first difference rate between the first sensor information and the second sensor information. The service cloud platform adjusts the valid information density based on the first difference rate. For example, the service cloud platform takes the product of the valid information density and the first difference rate as the adjusted valid information density.

The first difference rate characterizes a degree of difference between the first sensor information and the second sensor information. Exemplarily, the service cloud platform determines a difference between 1 and the similarity between the first sensor information and the second sensor information as the first difference rate. The service cloud platform may construct a feature vector based on the first sensor information and a feature vector based on the second sensor information, and represent the similarity between the first sensor information and the second sensor information through the similarity between the corresponding feature vectors. More descriptions of the vector matching may be found in FIG. 2 and its related description.

In some embodiments of the present disclosure, the degree of difference between the first sensor information and the second sensor information is considered in determining the valid information density, and the higher the degree of difference, the higher the valid information density, which allows for determining the valid information density that is more in line with actual situations. This in turn makes the determination of the information reference degree more reasonable and more comprehensive.

In some embodiments of the present disclosure, the degree of correlation between processes on different production lines as well as the valid information density are taken into account in determining the information reference degree, which can make the information reference degree more accurate.

In some embodiments, the service cloud platform determines third sensor information based on historical reference information sent to the candidate push object during a preset period; determines, based on a second difference rate between the first sensor information and the third sensor information, an increment of reference information for the first sensor information; and determines the information reference degree based on the increment of reference information.

The preset period is the time during which the second production line has produced a current model of product in the past.

The third sensor information is sensing information in the historical reference information. In some embodiments, the third sensor information includes a plurality of sets of data.

In some embodiments, the third sensor information is determined by the service cloud platform from the historical reference information. The historical reference information refers to the reference information that has been sent by the service cloud platform to the candidate push object during the preset period.

The increment of reference information refers to an increment in the amount of data of the first sensor information compared to an amount of data of the third sensor information.

In some embodiments, the increment of reference information is determined based on the amount of data of the first sensor information, the second difference rate, and the amount of data of the third sensor information. Exemplarily, the service cloud platform may determine a product of the amount of data of the first sensor information and the second difference rate, and determine a ratio of the product to the amount of data of the third sensor information as the increment of reference information. If the increment of reference information is less than a predetermined increase threshold, the service cloud platform maintains the original information reference degree. The preset increase threshold may be set in advance based on historical experience. For example, the preset increase threshold is 1.

More descriptions of the amount of data may be found in operation 320 and its associated description.

The second difference rate characterizes the degree of difference between the first sensor information and the third sensor information. The second difference rate is determined in the same manner as the first difference rate is determined, and the manner of determining the same may be seen in the manner of determining the first difference rate.

In some embodiments, the service cloud platform determines the information reference degree based on the increment of reference information. For example, the service cloud platform determines a difference between the increment of reference information and 1, and designates a product of the original information reference degree and the obtained difference as a new information reference degree.

In some embodiments of the present disclosure, when determining the information reference degree, the degree of difference between the sensing information in the historical reference information and the first sensor information are taken into account, which reduces the degree of repetition of the sensing information and makes the information reference degree more accurate.

In 330, determining the push demand value based on the information reference degree.

In some embodiments of the present disclosure, the service cloud platform determines the push demand value based on the information reference degree or the adjusted information reference degree. Exemplarily, the service cloud platform determines a product of a similarity between production parameters, the information reference degree, and a preset coefficient as the push demand value, wherein the preset coefficient may be pre-set based on historical experience. The similarity between production parameters may be expressed by the similarity between the first production vector and the second production vector, more descriptions of which may be found in FIG. 2 and its related description.

In some embodiments of the present disclosure, by determining the information reference degree, it is possible to specify the degree to which the first sensor information is available for reference, which in turn facilitates the rapid determination of a more reasonable push demand value.

In some embodiments, the service cloud platform sends preview reference information to a candidate push object based on a push demand value; obtains a feedback operation on the preview reference information performed by the candidate push object; and corrects the information reference degree based on the feedback operation.

The preview reference information refers to generalized reference information for preview. The service cloud platform may send the preview reference information to the candidate push object. The candidate push object may browse the preview reference information to determine if they need more detailed reference information.

In some embodiments, the preview reference information includes an association situation preview and a production quality preview. The association situation preview includes one or more processes having sub-correlation value(s) and the sub-correlation value(s) of the one or more processes.

The production quality preview refers to quality data of one or more processes having sub-correlation value(s). For example, the quality data of a process having a sub-correlation value includes a pass rate, a superior rate, or an inferior rate. The service platform may extract the quality data of the one or more processes having correlation value(s) from the first sensor information.

In some embodiments, the service cloud platform determines the preview reference information in multiple ways. For example, the service cloud platform determines a count of contents in the preview reference information based on the push demand value, and the larger the push demand value, the larger the count of contents in the preview reference information.

In some embodiments, the preview reference information may be determined based on a reference demand of the candidate push object.

In some embodiments, the service cloud platform may filter and identify the above-determined preview reference information based on the reference demand to obtain the preview reference information. For example, if the reference demand is "preventing disqualified products", the service cloud platform identifies, from the above-determined preview reference information, a process with relatively low quality data as new preview reference information, and the reference demand is designated as an identifier of the preview reference information. More descriptions of the reference demand may be found in FIG. 2 and its related descriptions.

In some embodiments of the present disclosure, the preview reference information determined based on the reference demand is more aligned with the needs of the candidate push object, while the preview reference information after filtering by the reference demand has a smaller amount of data, which can reduce the amount of data processing by the service cloud platform.

The feedback operation refers to the operation performed by an administrative user of the candidate push object after receiving the preview reference information. For example, the feedback operation includes operations such as requesting more content, temporarily ignoring, adjusting the push time, deleting, or the like.

In some embodiments, the candidate push object performs the feedback operation by interacting with the IIoT user platform.

In some embodiments, the service cloud platform corrects the information reference degree based on the feedback operation. For example, the service cloud platform queries a correction coefficient corresponding to the feedback operation from a correction table based on the feedback operation, and multiplies the correction coefficient with the information reference degree to obtain the corrected information reference degree. The correction table may be pre-set based on historical experience, including a plurality of feedback operations and a correction coefficient corresponding to each feedback operation.

In some embodiments, the service cloud platform determines a first matching degree between the first sensor information and the candidate push object based on the feedback operation; and based on the first matching degree, corrects the information reference degree.

The first matching degree may reflect the degree to which the reference demand preference of the candidate push object matches the first sensor information. In some embodiments, the first matching degree is expressed by a numerical value or the like, for example, the first matching degree may be set to a value in the range of 0-1, and the larger the value, the higher the first matching degree.

In some embodiments, the service cloud platform determines the first matching degree based on the feedback operation through a first matching relationship between the feedback operation and the first matching degree. A first matching relationship may be pre-set based on historical experience.

Exemplarily, the first matching relationship includes: if the feedback operation is to request more content, the first matching degree is 1; if the feedback operation is to adjust the push time, the first matching degree is between 0.9 and 0.6; if the administrative user has no feedback operation, the first matching degree is 0.5; if the feedback operation is to delete the preview reference information, the first matching degree is 0. The above values of the first matching degree are only for example, and the value of the first matching degree may be set according to needs in actual applications.

In some embodiments, the service cloud platform may multiply the first matching degree with the original information reference to obtain the corrected information reference degree.

In some embodiments of the present disclosure, sending the preview reference information to the candidate push object before sending the reference information saves time for the administrative user to make a confirmation and, based on the feedback operation, enables obtaining a closer fit to the actual needs of the administrative user for the information reference degree.

It should be noted that the foregoing description of process 300 is intended to be exemplary and illustrative only and does not limit the scope of application of the present disclosure. For a person skilled in the art, various corrections and changes may be made to process 300 under the guidance of this disclosure. However, these corrections and changes remain within the scope of this disclosure.

FIG. 4 is a schematic diagram of an exemplary demand model according to some embodiments of the present disclosure.

In some embodiments, a service cloud platform determines a reference demand 440 based on target sensor information 410 and first sensor information 420 corresponding to the target push object during a preset period through a demand model 430. More descriptions of the preset period, the target push object, the first sensor information, and the reference demand may be found in FIGS. 2 and 3 and their associated descriptions.

The target sensor information is the second sensor information corresponding to a target production line. In some embodiments, the target sensor information is determined by the service cloud platform from historical reference information. More descriptions of the historical reference information may be found in FIG. 3 and its related description.

The demand model is a model that may be used to determine the reference demand. In some embodiments, the demand model is a machine learning model. For example, the demand model is any one or a combination of a Deep Neural Networks (DNN) model, or other customized model structures, etc.

In some embodiments of the present disclosure, an input to the demand model includes the target sensor information and the first sensor information, and an output of the demand model includes the reference demand.

In some embodiments of the present disclosure, the service cloud platform trains the demand model based on a plurality of labeled training samples through a gradient descent technique, or the like. Each training sample of the plurality of training samples may include sample target sensor information and sample first sensor information, and the label of each training sample may be an actual reference demand.

In some embodiments of the present disclosure, the training samples may be obtained based on historical data, and the labels may be obtained based on manual labeling. For example, the service cloud platform may use sensing information from any two production lines in the historical data as a training sample. The labels are obtained by manual annotation by multiple technicians after analyzing and experimenting with the training sample. Exemplarily, the technicians analyze that the sensing information of one production line in the training sample may provide a reference to another production line in order to improve the quality of a product, and conduct actual experiments based on the training sample. If the experiments verify that the above analysis is correct, the training sample is labeled as "improving quality" in the reference demand.

In some embodiments of the present disclosure, the demand model may be obtained by training in the following manner: inputting a plurality of training samples with training labels into an initial demand model, constructing a loss function through the training labels and a prediction result of the initial demand model, iteratively updating the initial demand model based on the loss function, and when the loss function of the initial demand model meets a preset condition, the demand model training is completed. The preset condition may include that the loss function converges, a count of iterations reaches a set value, or the like.

In some embodiments of the present disclosure, the service cloud platform obtains a target feedback operation a target feedback operation performed by the target push object on the preview reference information; determines, based on the target feedback operation, a matching degree between the reference demand output by the demand model and a preference demand of the target push object; in response to the matching degree not satisfying a match condition, determines a service preference feature of the target push object based on the target feedback operation. The service cloud platform determines a preference training set based on the service preference feature, and obtains a target demand model for the target push object by training the demand model based on the preference training set, the target demand model being a machine learning model.

The target feedback operation is the feedback operation of the target push object when it receives the preview reference information. More about the feedback operation may be found in the corresponding description of FIG. 3.

The matching degree is the degree of match between the reference demand and the preference demand of the target push object. In some embodiments of the present disclosure, the matching degree is expressed by a numerical value or the like. For example, the matching degree may be set to a value in the range of 0-1, and the larger the value, the higher the matching degree is.

The preference demand is the reference demand that is preferred by the target push object. In some embodiments of the present disclosure, the preference demand may be entered into the service cloud platform by the target push object.

In some embodiments of the present disclosure, the service cloud platform determines a second matching degree based on the target feedback operation through a second matching relationship between the target feedback operation and the second matching degree. The second matching relationship may be preset based on historical experience. The second matching relationship is similar to the first matching degree relationship, and the second matching relationship may be obtained in the same manner as the manner for obtaining the first matching degree relationship.

In some embodiments of the present disclosure, the match condition includes the second matching degree being greater than a matching degree threshold. The matching degree threshold may include a minimum value of the second matching degree corresponding to the target feedback operation of "delaying push time". It may be understood that when the target feedback operation is "delaying push time", indicating that the target push object determines that the preview reference information needs to be viewed, then the prediction of the demand model is more accurate.

The service preference feature may reflect a preference of the target push object for the reference information. In some embodiments of the present disclosure, the service preference feature includes a percentage of different identifiers of the reference information.

In some embodiments of the present disclosure, the service cloud platform identifies the percentage of different identifiers of the reference information of the target feedback operations of "click for more content" and "delaying push time", and the percentage of different identifiers of the reference information is determined as the service preference feature. More descriptions of the identifiers of the reference information may be found in operation 250 and its associated description.

The preference training set is a collection of training samples for personalizing the demand model. In some embodiments of the present disclosure, the preference training set may include a first portion and a second portion. The service cloud platform may form the training samples for the first portion from historical first sensor information and historical second sensor information in a target push record. The target push record is a historical push record where the target feedback operation are "click for more content" and "delaying push time". There may be a plurality of groups of historical push records, wherein each group of historical push records corresponds to a single push of historical reference information at a historical time, and includes data related to the process of pushing the historical reference information.

The service cloud platform may determine, based on the identifiers of the historical reference information in the historical push records, historical reference information with an identifier that is the same as the identifier with a highest percentage in the service preference features. The historical first sensor information and historical second sensor information corresponding to the historical reference information in the historical push records are then used to form the second portion of the training samples.

The target demand model is a model that is specifically designed to determine the reference demand of the target push object. The target demand model includes the demand model that has been retrained.

In some embodiments of the present disclosure, the service cloud platform re-trains the demand model based on the preference training set to obtain the target demand model. A learning rate of the first portion of the re-training process is higher than a learning rate of the second portion.

In some embodiments of the present disclosure, the service cloud platform inputs labeled first portion and second portion of training samples into the demand model to retrain the demand model. The process for re-training the demand model is similar to the training process for the demand model above, and may be seen in the training process for the demand model above.

In some embodiments of the present disclosure, since the preference of the target push object changes with production situations, if a browsing rate, an adoption rate, etc. of the target push object for the reference information is low, it means that the current demand model does not meet the preference of the target push object. By preference training of the demand model, a demand model that better meets the actual needs of the target push object can be obtained, furthermore, it is beneficial to make the reference information more in line with the needs of the target push object.

In some embodiments of the present disclosure, the input to the demand model further includes the sub-correlation values of processes with sub-correlation values in the target production line and an influencing process chain. The training samples also include sample sub-correlation values and sample influencing process chains of sample processes. More descriptions of the influencing process chain and sub-correlation values may be found in the corresponding descriptions of FIG. 3.

In some embodiments of the present disclosure, the longer the influencing process chain and the higher the sub-correlation values indicate that there is, the greater a similarity between the target production line and the first production line is. Inputting the influencing process chain and the sub-correlation values into the demand model can obtain a more accurate reference demand.

In some embodiments of the present disclosure, the sensing information on different production lines is vast and complex, and using the demand model to determine the reference demand of the target push object can avoid inaccuracies in reference demands due to the lack of precision in the subjective determination of the target push object, thereby determining more accurate and comprehensive reference demands.

Some embodiments of the present disclosure further provide a non-transitory computer-readable storage medium. The storage medium stores computer instructions, and when a computer reads the computer instructions in the storage medium, the computer executes the method described in any of the embodiments of the present disclosure.

Having thus described the basic concepts, it may be rather apparent to those skilled in the art after reading this detailed disclosure that the foregoing detailed disclosure is intended to be presented as illustrative example and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of the present disclosure.

Moreover, certain terminology has been configured to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this disclosure are not necessarily all referring to the same embodiment. Furthermore, the particular features, structures, or characteristics may be combined as suitable in one or more embodiments of the present disclosure.

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be noted that in the foregoing description of embodiments of the present disclosure, various features are sometimes grouped together in a single embodiment, figure, or description thereof for the purpose of streamlining the disclosure aiding in the understanding of one or more of the various inventive embodiments. This way of disclosure, however, is not to be interpreted as reflecting an intention that the claimed subject matter requires more features than are expressly recited in each claim. Rather, inventive embodiments lie in less than all features of a single foregoing disclosed embodiment.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrating of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A method for information push in Industrial Internet of Things (IIoT) based on a service cloud platform, wherein the method is executed by the service cloud platform of a system for information push in IIoT, and the method comprises:

obtaining first sensor information of a first production line via an IIoT service platform corresponding to the first production line;

determining a candidate push object based on the first sensor information, the candidate push object including an administrative user of at least one second production line;

constructing a plurality of first production vectors based on a production parameter of each production device in the first sensor information, and constructing a plurality of second production vectors based on a production parameter of each production device in second sensor information of the at least one second production line;

determining a reference attribute of the first sensor information based on monitoring data in the first sensor information;

determining a push demand value of the candidate push object based on the reference attribute of the first sensor information, a similarity between the plurality of second production vectors and the plurality of first production vectors, and the candidate push object, wherein the push demand value characterizes an extent to which the candidate push object needs the first sensor information;

determining a target push object based on the push demand value, the target push object including an administrative user of a target production line among the at least one second production line;

determining, based on the first sensor information, reference information of the target push object, and sending the reference information to an IIoT user platform corresponding to the target push object;

in response to receiving a recommended demand, generating at least one of a recommended production parameter and a recommended monitoring parameter based on the reference information, wherein the recommended demand is determined by the target push object based on the reference information, and the recommended demand is sent by the target push object through the IIoT user platform corresponding to the target push object;

sending at least one of the recommended production parameter and the recommended monitoring parameter to the IIoT user platform corresponding to the target push object and obtaining confirmation information; and generating, based on the confirmation information, an adjustment instruction, and sending the adjustment instruction to an IIoT service platform corresponding to the target production line, so as to adjust a production parameter of a production device and a monitoring parameter of a monitoring device on the target production line.

2. The method of claim 1, wherein the determining a push demand value of the candidate push object based on the reference attribute of the first sensor information, a similarity between the plurality of second production vectors and the plurality of first production vectors, and the candidate push object includes:

obtaining the second sensor information of the at least one second production line via at least one IIoT service platform corresponding to the at least one second production line;

determining, based on the first sensor information and the second sensor information, an information reference degree of the first sensor information to the candidate push object; and determining the push demand value based on the information reference degree.

3. The method of claim 2, further comprising:

sending preview reference information to the candidate push object based on the push demand value and obtaining a feedback operation performed by the candidate push object on the preview reference information; and correcting the information reference degree based on the feedback operation.

4. The method of claim 1, wherein the determining, based on the first sensor information, reference information of the target push object, and sending the reference information to an IIoT user platform corresponding to the target push object includes:

obtaining a reference demand of the target push object; and determining the reference information based on the reference demand and the first sensor information.

5. The method of claim 4, wherein the determining the reference information based on the reference demand and the first sensor information includes:

determining correlated sensor information in the first sensor information based on the reference demand;

setting a reference identifier to the correlated sensor information based on the reference demand; and designating the correlated sensor information with the reference identifier as the reference information.

6. A non-transitory computer-readable storage medium storing computer instructions, wherein when a computer reads the computer instructions in the storage medium, the computer implements the method of claim 1.

* * * * *